April 9, 1957
H. S. HARRISON
2,787,977
TIRE LUBRICATING MACHINE
Filed April 8, 1953
4 Sheets-Sheet 3
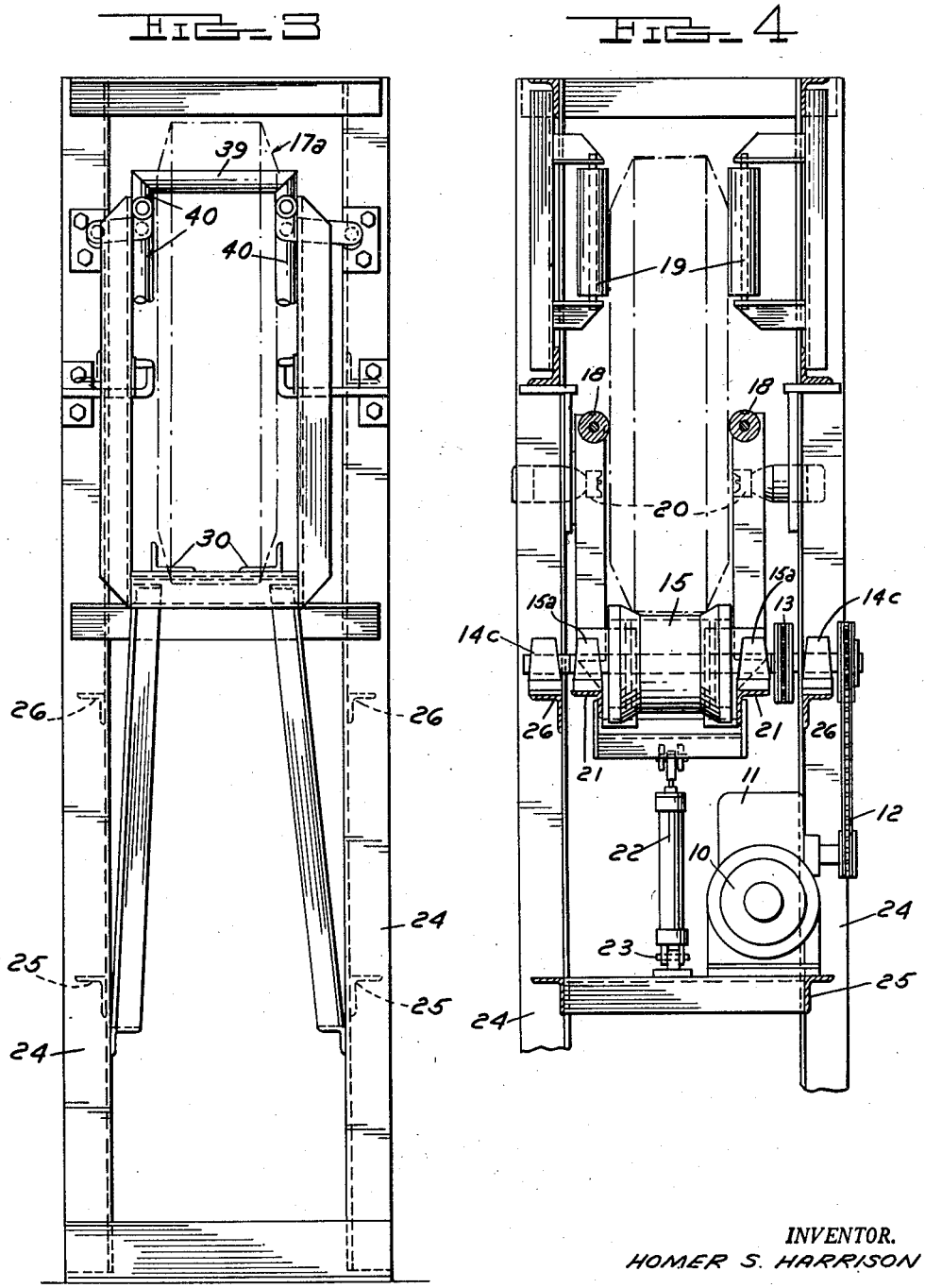
INVENTOR.
HOMER S. HARRISON
BY
ATTORNEYS April 9, 1957    H. S. HARRISON    2,787,977
TIRE LUBRICATING MACHINE
Filed April 8, 1953    4 Sheets-Sheet 4

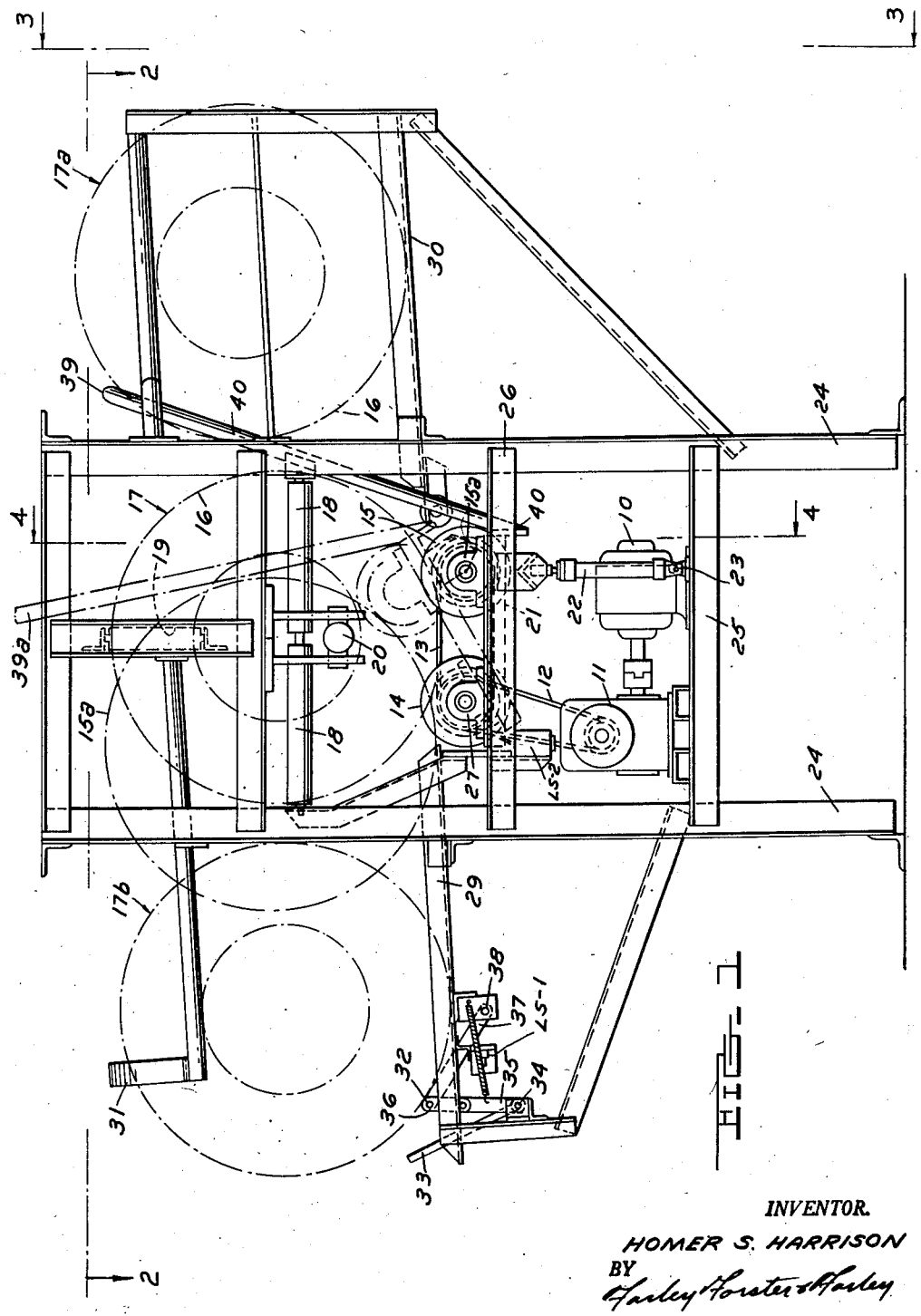

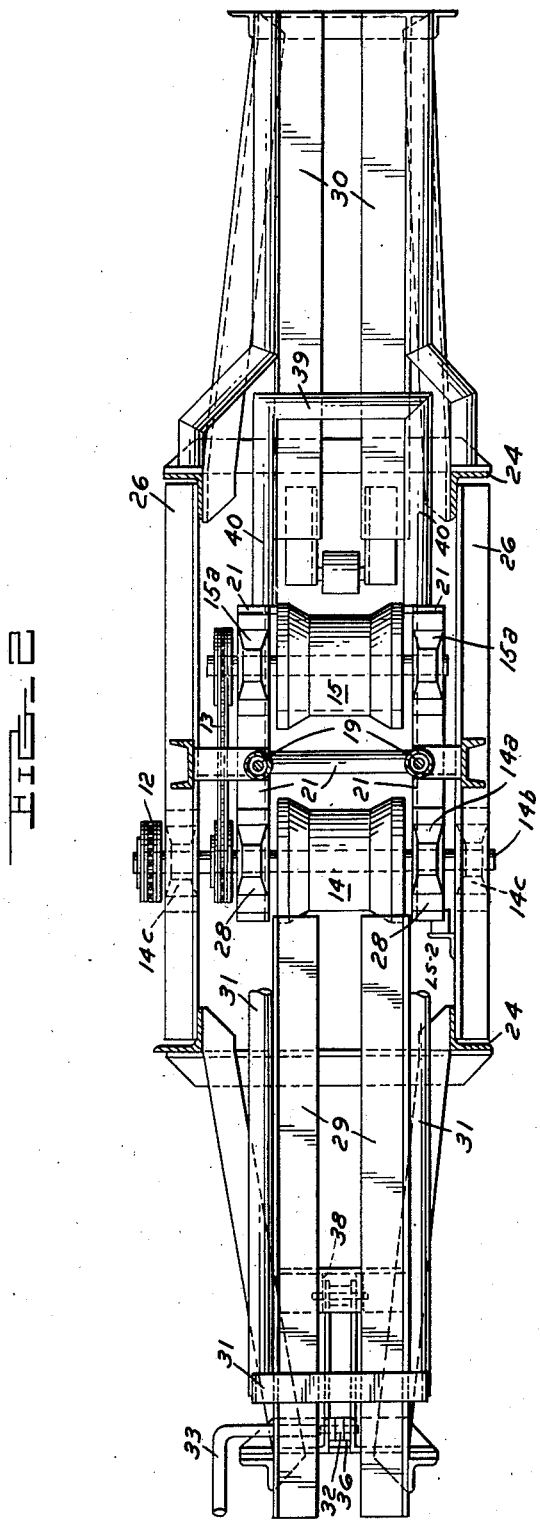

INVENTOR.
HOMER S. HARRISON
BY
*Harley Forster & Harley*

ATTORNEYS

United States Patent Office 2,787,977
Patented Apr. 9, 1957

2,787,977
TIRE LUBRICATING MACHINE

Homer S. Harrison, Detroit, Mich., assignor to Allied Steel and Conveyors, Inc., Detroit, Mich., a corporation of Michigan Application April 8, 1953, Serial No. 347,547

15 Claims. (Cl. 118—11)

This invention relates to a tire lubricating machine for applying a liquid soap solution or similar lubricant prior to wheel assembly operations. In automotive wheel and tire production assembly operations, it is conventional practice preparatory to the insertion of inner tubes and the mounting of tires on automotive vehicle wheels to apply a liquid soap or other similar lubricant to the inner casing and bead of the tire in order to facilitate insertion of the tube, pressing of the tire over the rim of the wheel, and proper location and adjustment of the tube within the tire casing upon inflation thereof. Such lubricating operation is ordinarily performed manually with a brush or spray gun and due to the large area and remote location of the surfaces of the tire to be so coated, the manual application is often incomplete and lacking in desired uniformity as well as time consuming. The present invention contemplates a machine for automatically performing this operation in timed sequence with requirements for feeding tires to a tire mounting machine.

The conventional assembly of tires and wheels involves the steps of manual soaping of the tire, manual insertion of the tube, and manual placement of the tire and tube over one edge of a wheel carried flat on a conveyor of a tire mounting machine. The present machine is adapted to deliver tires fully soaped to a location near the point of loading on the tire mounting machine where the operator inserts the tubes. The construction of the tire soaping machine contemplates the release of a tire from the soaping machine by the operator who inserts the tube, in response to which release another tire is automatically soaped and delivered to a position for release as soon as the operator is ready to insert another tube. The present machine also contemplates an automatic feed of an additional tire into soaping position upon delivery of each preceding tire.

In order to obtain a uniform application of a liquid soap solution, a pair of spray guns are located in the machine at a fixed position near one edge of the bead, the nozzle of each of said guns being directed inwardly toward the interior of the casing with an arc of spray adequate to cover the outer bead immediately adjacent as well as the opposite inner casing, provision being made to rotate the tire about its own axis for at least one complete revolution while the spray is on, with automatic means for thereafter stopping the spray and discharging the tire to a position for manual release.

Accordingly, the principal object of the present invention is to provide an automatic tire lubricating machine which will provide a uniform liquid coating of a predetermined quantity to all surfaces of the tire requiring lubrication for facilitating tube location and tire mounting.

Another object is to provide automatic means for rotating the tire relative to fixed spray nozzles in order to secure such desired uniform soap application.

Another object is to provide automatic means for stopping the spray when a given tire has been fully lubricated.

Another object is to provide automatic means for discharging a lubricated tire to a position for manual release from the machine.

Another object is to provide automatic means for feeding additional tires into the lubricating machine as they are discharged therefrom.

These and other objects will be more apparent from the following detailed description of a preferred embodiment and from an examination of the drawings forming a part hereof wherein:

Fig. 1 is a side elevation of the tire lubricating machine;

Fig. 2 is a plan view of such machine;

Fig. 3 is an end elevation taken along the line 3—3 of Fig. 1;

Fig. 4 is an end elevation taken along the line 4—4 of Fig. 1;

Figure 5:
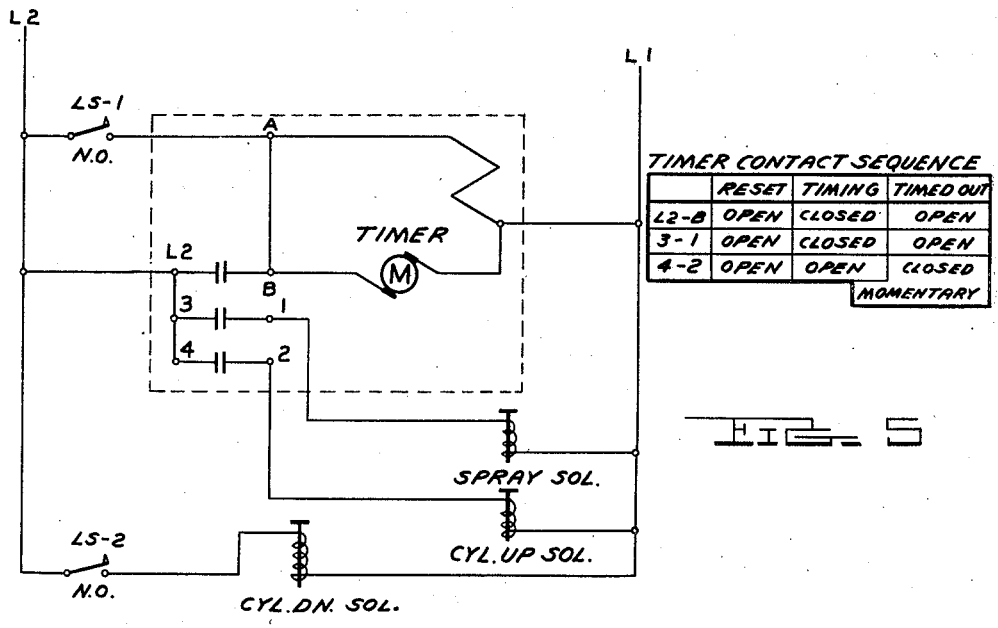
Fig. 5 is a wiring diagram for the electrical components of the controls employed in the machine.

Referring to Fig. 1 it will be seen that a motor 10 is adapted through reduction gearing 11 and sprocket chains 12 and 13 to drive a pair of rollers 14 and 15 adapted to engage the outer tread 16 of a tire 17 during soaping operation, two pairs of horizontal rollers 18 and a pair of vertical rollers 19 being provided on either side of the machine to engage the side walls of the tire during rotation to stabilize its position. A pair of spray nozzles 20 are located in a fixed position on either side of the machine near the lower bead of a tire to be sprayed, such nozzle being formed and directed to coat the adjacent bead and opposite inner wall of a tire during its rotation. The tread roller 15 is rotatably journaled in bearings 15a on a pair of arms 21, the ends of which are pivotally connected by bearings 14a to the through shaft 14b journaled in fixed bearings 14c for the tread roller 14, while an air cylinder 22 pivotally anchored to the frame of the machine at 23 is adapted to swing the roller 15 upwardly through an arc established by the arms 21 to an upper position of the tread roller 15 as shown in phantom at 15a.

The frame of the machine includes uprights 24 for mounting a platform 25 for the motor and reduction gear, longitudinal members 26 for mounting bearings 14c for the tread roller 14 as well as suitable members for supporting the rollers 18 and 19 and spray nozzles 20 as shown. In addition, the frame of the machine carries a downwardly sloping outlet ramp 29 and inlet ramp 30 suitably braced as shown.

A fixed stop 31 extending transversely across and slightly above the path of a tire moving down the ramp 29 cooperates with a movable stop 32 to limit the travel of such tire. The stop 32 is moved down to a nonobstructing position by manual actuation of a spring loaded handle 33 pivoted at 34 and adapted to break links 35 and 36 permitting link 37 which is pivotally connected to a frame member at 38 to move down with stop 32.

At the inlet end of the machine a movable transversely extending stop 39 mounted on arms 40 integrally connected to the ends of the arms 21 normally limits the travel of a tire 17a down the ramp 30 as shown, such stop 39 being moved to the phantom position 39a when the tread roller 15 is raised by air cylinder 22 thereby permitting a tire 17a to advance initially to a position limited by the tread roller in its upper position 15a and finally to the central position engaging both rollers 14 and 15 as shown by the phantom tire 17 when the air cylinder 22 retracts the tread roller 15 to its normal position.

A spring return limit switch LS–1 is actuated by an extension of the link 37 whenever the handle 33 is moved down to release a tire from the delivery end of the machine while a second limit switch LS–2 is actuated by an extension of one of the arms 21 at the top of the stroke of the air cylinder 22.

Figure 6:
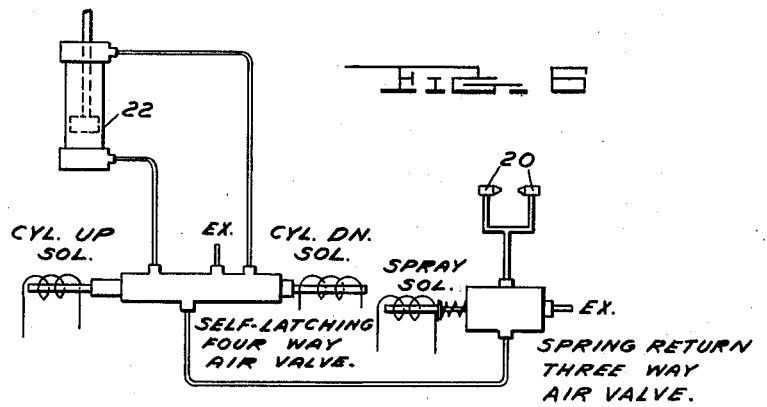
Fig. 6 is a piping diagram for the fluid pressure controls employed in such machine.

The operation of the machine may be further understood by reference to the control diagram shown in Figs. 5 and 6. In following through the operation of a complete cycle it may be assumed that three tires are in the machine in the positions indicated at 17a, 17 and 17b, the tire at 17b having been previously lubricated and ready for release. When the handle 33 is manually depressed, the movable stop 32 is moved down to a non-obstructing position permitting the tire 17b to roll under the stop 31 and off the ramp 29. In depressing the handle 33, the normally open spring return limit switch LS-1 is closed energizing the timer shown in the wiring diagram of Fig. 5 thereby starting a timing cycle during which the contact L2-B closes a circuit from L2 to L1 for running the timer motor M and the contact 3-1 closes a circuit for energizing a spray solenoid which actuates a spring return three-way air valve for the two spray gun nozzles 20. The tread rollers 14 and 15 are driven continuously by the motor 10 during the entire operation of the machine and the spraying of the tire 17 will accordingly proceed for a period established by the setting of the timer.

When the timer runs out the L2-B and 3-1 contacts are opened and the 4-2 contact establishing a circuit through a cylinder-up solenoid is momentarily closed thereby actuating a self-latching four-way air valve to a "cylinder-up" position thereby raising the tread roller 15 to the position 15a causing the tire 17 to roll out onto the ramp 29 where its movement is arrested by the movable stop 32 and fixed stop 31.

As the tread roller 15a is raised the stop 39 is simultaneously raised to the position indicated at 39a permitting the tire 17a to roll down the ramp 30 to a position limited by contact with the raised tread roller. When the air cylinder 22 reaches the limit of its stroke, the normally open spring return limit switch LS-2 is closed by the final movement of arm 21 thereby closing a circuit to a cylinder-down solenoid which actuates the four-way air valve to return the air cylinder 22 and tread roller 15 to normal position. The downward movement of the roller 15 permits the tire 17a to roll into spraying position while the stop 39 moves down behind the tire 17a to limit the travel of another incoming tire on the ramp 30. When the cylinder 22 reaches the lower limit of its travel, the cycle is completed and the new tire engaged by the rollers 14 and 15 continues to rotate without spray application until the handle 33 is again actuated to release an additional tire.

Since the timing cycle for applying the lubricant may be readily adapted to the speed of the tire mounting machine, a freshly sprayed tire will be delivered to the release position on the ramp 29 just in advance of the requirement for such tire, while the exact coordination of the delivery of sprayed tires is rendered subject to manual variations in the time required for insertion of the tube and placement of tire and tube in mounting position on a wheel of the tire mounting machine. Thus it will be seen that subject to the single manual release operation, an automatic tire soaping machine has been provided which meets each of the objects set forth above.

While a particular preferred embodiment has been set forth above in detail, it will be understood that numerous modifications may be resorted to without departing from the scope of my invention as defined in the following claims.

I claim:

1. A machine for applying a liquid coating on predetermined surfaces of a series of tires, comprising: means for rotating one of the tires about its own axis, spray means adapted to direct said liquid to said surface during rotation, automatic timer means for limiting said spray application to a predetermined time cycle, manual means for releasing a tire from the machine, and means responsive to said manual means for initiating operation of the automatic timer means for limiting said spray application to a subsequent tire of the series.

2. A machine for applying a liquid coating on a predetermined surface of a tire comprising tread-engaging means for rotating said tire about its own stationary horizontal axis, fixed stationary spray means located above the tire bead on either side adapted to direct said liquid to said interior surface during rotation, means for limiting said spray application to a predetermined time cycle, automatic means responsive to operation of said timing means for ejecting a tire from said fixed spraying position at the completion of said time cycle, and means responsive to operation of said automatic ejecting means for positioning another tire on said tread-engaging means.

3. A machine for applying a liquid coating on a predetermined surface of a tire, comprising means for rotating said tire about its own stationary horizontal axis, stationary spray means adapted to direct said liquid to said surface during rotation, means for limiting said spray application to a predetermined time cycle, automatic means responsive to operation of said timing means for ejecting a tire from said fixed spraying position at the completion of said time cycle, and means for retaining said ejected tire in a position for manual release from the machine, independently of the automatic ejection of the tire from said fixed spraying position.

4. A machine for applying a liquid coating on a predetermined surface of a tire, comprising means for rotating said tire about its own stationary horizontal axis, stationary spray means adapted to direct said liquid to said surface during rotation, means for limiting said spray application to a predetermined time cycle, automatic means responsive to operation of said timing means for ejecting a tire from said fixed spraying position at the completion of said time cycle, means responsive to the ejection of one tire for introducing a further tire to a position for spray application, and means for holding an ejected tire in a position for manual release from the machine.

5. A machine for applying a liquid coating on a predetermined surface of a tire, comprising means for rotating said tire about its own stationary axis, stationary spray means adapted to direct said liquid to said surface during rotation, means for limiting said spray application to a predetermined time cycle, automatic means for ejecting a tire from said fixed spraying position at the completion of said time cycle, means responsive to the ejection of one tire for introducing a further tire to a position for spray application, means for holding an ejected tire in a position for manual release from the machine, and means responsive to manual release of said ejected tire for initiating a new timing cycle for spraying a further tire.

6. A machine as set forth in claim 2 wherein said means for rotating a tire comprises a pair of relatively horizontally disposed, longitudinally spaced, continuously driven tread-engaging rollers, wherein said means for ejecting a tire comprises means for momentarily raising one of said rotating rollers, wherein the last named means are actuated by the raising and lowering of said roller for admitting another tire to spraying position, said last named means including an inclined ramp leading to said rollers, and a mechanical stop normally obstructing movement of a tire down said ramp, said stop being moved to a nonobstructing position by the raising of said roller.

7. A machine as set forth in claim 3 wherein said means for rotating a tire comprises a pair of relatively horizontally disposed, longitudinally spaced, continuously driven tread-engaging rollers, wherein said means for ejecting a tire comprises means for momentarily raising one of said rotating rollers, wherein means are actuated by the raising and lowering of said roller for admitting another tire to spraying position, said latter means including an inclined ramp leading to said rollers, and a mechanical stop normally obstructing movement of a tire down said ramp, said stop being moved to a nonobstructing position by the raising of said roller, and wherein said means for retaining an ejected tire comprise an inclined ramp for receiving a tire ejected from spray position, and manually releasable means for obstructing a tire's movement down said latter ramp.

8. A machine as set forth in claim 3 wherein said means for rotating a tire comprises a pair of relatively horizontally disposed, longitudinally spaced, continuously driven tread-engaging rollers, wherein said means for ejecting a tire comprises means for momentarily raising one of said rotating rollers, wherein means are actuated by the raising and lowering of said roller for admitting another tire to spraying position, said latter means including an inclined ramp leading to said rollers, and a mechanical stop normally obstructing movement of a tire down said ramp, said stop being moved to a nonobstructing position by the raising of said roller, wherein said means for retaining an ejected tire comprise an inclined ramp for receiving a tire ejected from spray position, and manually releasable means for obstructing a tire's movement down said latter ramp, and wherein electrical means including a limit switch actuated by the release of said ejected tire is provided for initiating a new spraying cycle.

9. A machine as set forth in claim 3 wherein said means for rotating a tire comprises a pair of relatively horizontally disposed, longitudinally spaced, continuously driven tread-engaging rollers, wherein said means for ejecting a tire comprises means for momentarily raising one of said rotating rollers, wherein means are actuated by the raising and lowering of said roller for admitting another tire to spraying position, said latter means including an inclined ramp leading to said rollers, and a mechanical stop normally obstructing movement of a tire down said ramp, said stop being moved to a nonobstructing position by the raising of said roller, wherein said means for retaining an ejected tire comprise an inclined ramp for receiving a tire ejected from spray position, and manually releasable means for obstructing a tire's movement down said latter ramp, and wherein electrical means including a limit switch actuated by the release of said ejected tire is provided for initiating a new spraying cycle, said electrical means including an electrical timer actuated by said limit switch.

10. A machine as set forth in claim 3 wherein said means for rotating a tire comprises a pair of relatively horizontally disposed, longitudinally spaced, continuously driven tread-engaging rollers, wherein said means for ejecting a tire comprises means for momentarily raising one of said rotating rollers, wherein means are actuated by the raising and lowering of said roller for admitting another tire to spraying position, said latter means including an inclined ramp leading to said rollers, and a mechanical stop normally obstructing movement of a tire down said ramp, said stop being moved to a nonobstructing position by the raising of said roller, wherein said means for retaining an ejected tire comprise an inclined ramp for receiving a tire ejected from spray position, and manually releasable means for obstructing a tire's movement down said latter ramp, and wherein electrical means including a limit switch actuated by the release of said ejected tire is provided for initiating a new spraying cycle, said electrical means including an electrical timer actuated by said limit switch, and an electrical solenoid energized by said timer for controlling the spray cycle.

11. A machine as set forth in claim 3 wherein said means for rotating a tire comprises a pair of relatively horizontally disposed, longitudinally spaced, continuously driven tread-engaging rollers, wherein said means for ejecting a tire comprises means for momentarily raising one of said rotating rollers, wherein means are actuated by the raising and lowering of said roller for admitting another tire to spraying position, said latter means including an inclined ramp leading to said rollers, and a mechanical stop normally obstructing movement of a tire down said ramp, said stop being moved to a nonobstructing position by the raising of said roller, wherein said means for retaining an ejected tire comprise an inclined ramp for receiving a tire ejected from spray position, and manually releasable means for obstructing a tire's movement down said latter ramp, and wherein electrical means including a limit switch actuated by the release of said ejected tire is provided for initiating a new spraying cycle, said electrical means including an electrical timer actuated by said limit switch, an electrical solenoid energized by said timer for controlling the spray cycle, and an air valve actuated by said solenoid for starting and stopping said spray.

12. A machine as set forth in claim 3 wherein said means for rotating a tire comprises a pair of relatively horizontally disposed, longitudinally spaced, continuously driven tread-engaging rollers, and wherein said means for ejecting a tire comprises means for raising one of said rotating rollers including a fluid pressure cylinder and electrical means responsive to the manual release of a previously ejected tire for actuating said cylinder.

13. A machine as set forth in claim 3 wherein said means for rotating a tire comprises a pair of relatively horizontally disposed, longitudinally spaced, continuously driven tread-engaging rollers, and wherein said means for ejecting a tire comprises means for raising one of said rotating rollers including a fluid pressure cylinder and electrical means responsive to the manual release of a previously ejected tire for actuating said cylinder, said electrical means including a limit switch responsive to said manual release.

14. A machine as set forth in claim 3 wherein said means for rotating a tire comprises a pair of relatively horizontally disposed, longitudinally spaced, continuously driven tread-engaging rollers, and wherein said means for ejecting a tire comprises means for raising one of said rotating rollers including a fluid pressure cylinder and electrical means responsive to the manual release of a previously ejected tire for actuating said cylinder, said electrical means including a limit switch responsive to said manual release and a limit switch responsive to the completion of said cylinder stroke for initiating a return of said cylinder.

15. A machine as set forth in claim 3 wherein said means for rotating a tire comprises a pair of relatively horizontally disposed, longitudinally spaced, continuously driven tread-engaging rollers, and wherein said means for ejecting a tire comprises means for raising one of said rotating rollers including a fluid pressure cylinder and electrical means responsive to the manual release of a previously ejected tire for actuating said cylinder, said electrical means including a limit switch responsive to said manual release, a limit switch responsive to the completion of said cylinder stroke for initiating a return of said cylinder, and a solenoid actuated fluid pressure valve responsive to said limit switches for controlling the actuation of said cylinder.

References Cited in the file of this patent

UNITED STATES PATENTS

| | | |
|---|---|---|
| 1,231,222 | Urbach | June 26, 1917 |
| 1,471,787 | Gammeter | Oct. 23, 1923 |
| 1,474,654 | Urbach | Nov. 20, 1923 |
| 1,700,697 | Draper | Jan. 29, 1929 |
| 1,850,238 | Maynard | Mar. 22, 1932 |
| 1,983,684 | Strong | Dec. 11, 1934 |